(12) United States Patent
Tran et al.

(10) Patent No.: US 7,489,417 B2
(45) Date of Patent: Feb. 10, 2009

(54) USB PRINT

(75) Inventors: Peter H N Tran, Garden Grove, CA (US); Marianne L. Kodimer, Huntington Beach, CA (US); Darrell V. Hopp, Mission Viejo, CA (US); Amir Shahindoust, Laguna Niguel, CA (US)

(73) Assignees: Toshiba Corporation (JP); Toshiba Tec Kabushiki Kaisha (JP)

( * ) Notice: Subject to any disclaimer, the term of this patent is extended or adjusted under 35 U.S.C. 154(b) by 1044 days.

(21) Appl. No.: 10/675,071

(22) Filed: Sep. 30, 2003

(65) Prior Publication Data

US 2005/0068579 A1   Mar. 31, 2005

(51) Int. Cl.
| G06F 15/82 | (2006.01) |
| G06F 11/30 | (2006.01) |
| G06F 11/32 | (2006.01) |
| G06F 15/16 | (2006.01) |
| G06F 15/17 | (2006.01) |
| G06F 3/147 | (2006.01) |
| G06F 3/12 | (2006.01) |
| G06F 3/06 | (2006.01) |
| G06T 1/00 | (2006.01) |
| G06K 15/00 | (2006.01) |

(52) U.S. Cl. ............... 358/1.16; 358/1.13; 358/1.15
(58) Field of Classification Search .................. None
See application file for complete search history.

(56) References Cited

U.S. PATENT DOCUMENTS

| 4,719,516 A | * | 1/1988 | Nagashima | ............... 358/448 |
| 4,990,954 A | * | 2/1991 | Higashio et al. | ............. 399/83 |
| 5,043,762 A | * | 8/1991 | Iwaki et al. | ................ 399/182 |
| 5,260,742 A | * | 11/1993 | Kikkawa | ................ 399/83 |
| 5,526,469 A | * | 6/1996 | Brindle et al. | ............... 358/1.9 |
| 5,761,399 A | * | 6/1998 | Asano | ...................... 358/1.15 |
| 5,881,233 A | * | 3/1999 | Toyoda et al. | ............... 709/233 |
| 5,923,437 A | * | 7/1999 | Itoh | .......................... 358/401 |
| 5,928,347 A | | 7/1999 | Jones | |

(Continued)

FOREIGN PATENT DOCUMENTS

EP   1267254 A2 * 12/2002

(Continued)

*Primary Examiner*—Twyler L Haskins
*Assistant Examiner*—Myles D Robinson
(74) *Attorney, Agent, or Firm*—Tucker Ellis & West LLP

(57) ABSTRACT

The invention is directed to a system and interface wherein a multifuntion copier, equipped with a Universal Serial Bus port, accepts data directly from a USB-Data Storage Device (USB-DSD) for the purpose of printing, e-mailing, and faxing. The system contains a copier containing a computer-controller having at least one USB port interface. The controller has a service that can either be enabled or disabled by a system administrator. The service is capable of performing email, printing and facsimile fuctions. When a user inserts a USB-DSD into the USB port on the controller, the service presents the user with the three options stated above. Once the utility, which scans the USB-DSD and displays the supported files found on the DSD. Each desired funtion will have multiple options for a user to choose. For example, when the printing option is selected, the service will present to the user on the display choices such as duplex, portrit/landscape, multipage, number of prints and the like.

20 Claims, 4 Drawing Sheets

U.S. PATENT DOCUMENTS

| | | |
|---|---|---|
| 5,987,535 A * | 11/1999 | Knodt et al. ............... 710/15 |
| 6,111,014 A | 8/2000 | Wang et al. |
| 6,111,659 A | 8/2000 | Murata |
| 6,145,046 A | 11/2000 | Jones |
| 6,330,067 B1 | 12/2001 | Murata |
| 6,356,357 B1 | 3/2002 | Anderson et al. |
| 6,385,677 B1 * | 5/2002 | Yao ............................ 711/115 |
| 6,426,801 B1 | 7/2002 | Reed |
| 6,535,298 B2 | 3/2003 | Winter et al. |
| 6,606,161 B2 | 8/2003 | Murata |
| 6,763,399 B2 * | 7/2004 | Margalit et al. ............ 710/13 |
| 6,831,753 B1 * | 12/2004 | Tsuchitoi .................. 358/1.14 |
| 6,862,104 B2 * | 3/2005 | Yajima et al. ............. 358/1.15 |
| 6,892,251 B2 * | 5/2005 | Anderson et al. ........... 710/20 |
| 7,095,525 B2 * | 8/2006 | Itoh .......................... 358/1.16 |
| 2001/0043340 A1 | 11/2001 | Murata |
| 2001/0052994 A1 | 12/2001 | Murata |
| 2001/0052997 A1 | 12/2001 | Satake et al. |
| 2002/0075524 A1 * | 6/2002 | Blair et al. .................. 358/442 |
| 2002/0186393 A1 * | 12/2002 | Pochuev et al. ........... 358/1.13 |
| 2003/0038971 A1 | 2/2003 | Renda |
| 2003/0063148 A1 | 4/2003 | Tanaka |
| 2003/0063313 A1 * | 4/2003 | Ito ............................ 358/1.15 |
| 2003/0067620 A1 | 4/2003 | Masumoto et al. |
| 2003/0076529 A1 * | 4/2003 | Gomes et al. ............. 358/1.15 |
| 2003/0090695 A1 | 5/2003 | Murata |
| 2003/0107762 A1 | 6/2003 | Kinoshita et al. |
| 2003/0112456 A1 | 6/2003 | Tomita et al. |
| 2003/0140810 A1 | 7/2003 | Sugimoto |
| 2003/0154383 A9 | 8/2003 | Wiley et al. |
| 2003/0156200 A1 | 8/2003 | Romano et al. |
| 2003/0158947 A1 | 8/2003 | Bloch et al. |
| 2003/0161628 A1 | 8/2003 | Ito et al. |
| 2003/0182456 A1 * | 9/2003 | Lin et al. .................... 709/250 |
| 2006/0039033 A1 * | 2/2006 | French et al. ............. 358/1.16 |

FOREIGN PATENT DOCUMENTS

| | | | |
|---|---|---|---|
| JP | 2003044245 A | * | 2/2003 |
| JP | 2003099214 A | * | 4/2003 |

* cited by examiner

USB PRINT

BACKGROUND OF THE INVENTION

The present invention pertains generally to data storage devices. More particularly, the present invention is related to printing, faxing or electronic mailing directly from a data storage device.

Universal Serial Bus, or USB, data storage devices are increasingly common devices to store data and transfer data among computers. They are used to store documents such as Word, PowerPoint, and Excel documents, as well as PDF files and CAD drawings. Because of their increased storage capacity, they are replacing the previously popular floppy disks and zip disks that were once used for mobile storage mediums. In the typical case, the user attaches the USB data storage device to a computer's USB port. Data files are then transferred directly from the computer to the USB data storage device. The user is then able to remove the device and connect it to another computer. This computer then accesses the USB data storage device and the user is able to transfer the stored data files from the USB data storage device to the second computer's hard drive.

Current printing devices require a computer in communication with the printer, enabling the insertion of a USB data storage device into the computer and transmitting from the computer to the printer. The user must then determine the actions to be performed by the attached multifunction peripheral. This results in a large document queue, as multiple users have documents waiting in the queue for printing. Further, a user may never be certain as to the timing of the printout of work as the document queue may have multiple print jobs in front of the user.

Thus, there exists a need for a method and system whereby a user can print, fax or email directly from a multifunction peripheral irrespective of a network presence.

SUMMARY OF THE PRESENT INVENTION

In accordance with the present invention, there is a method and system for a multifunction digital copier to accept data directly from a removable storage device for printing, copying, faxing or emailing.

Further in accordance with the present invention, there is method and system for accessing a removable storage medium directly from a digital copier display console.

In one embodiment of the present invention, there is a method for processing a document from a portable data storage device, comprising the steps of receiving an associated portable data storage device into a document rendering device, the portable data storage device inclusive of at least one electronic document stored in a native application format from which it was generated, receiving administrative data representative of document processing privilege, selectively activating, in accordance with received administrative data, a document processing service associated with the document rendering device upon insertion of the portable data storage device, generating a user prompt as to document processing options associated with the portable data storage device, and receiving user input as to at least one selected document processing option to be performed on the at least one file.

In another embodiment of the present invention, there is a system for processing a document from a portable data storage device, comprising means adapted to receiving an associated portable data storage device into a document rendering device, the portable data storage device inclusive of at least one electronic document stored in a native application format from which it was generated, means adapted to receiving administrative data representative of document processing privilege, means adapted to selectively activating, in accordance with received administrative data, a document processing service associated with the document rendering device upon insertion of the portable data storage device, means adapted to generating a user prompt as to document processing options associated with the portable data storage device, and means adapted to receiving user input as to at least one selected document processing option to be performed on the at least one file.

Additional objects, advantages and novel features of the invention will be set forth in part in the description which follows, and in part will become apparent to those skilled in the art upon examination of the following or may be learned by practice of the invention. The objects and advantages of the invention may be realized and attained by various structures and methods as covered by the patent claims.

BRIEF DESCRIPTION OF THE DRAWINGS

The accompanying figures incorporated in and forming a part of the specification, illustrates several aspects of the present invention, and together with the description serve to explain the principles of the invention. In the figures.

DETAILED DESCRIPTION OF THE PREFERRED AND ALTERNATE EMBODIMENTS

The present invention is directed to a system and method for a multifunction peripheral device to handle documents directly from a data storage device. More particularly, the present invention is directed to a method for selectively processing a document stored on a removable data storage device in accordance with a user selected function.

As discussed herein, the terms "controller" and "printer" are synonymous for the multifunction peripheral device as used in the preferred embodiment, however one of ordinary skill in the art will appreciate that the use of the aforementioned and below described invention need not be limited to such a multifunction peripheral device. Other printing and reproduction devices, including, but not limited to scanners, ink jet printers, laser jet printers, and the like, are also contemplated by the present invention, and the service may be built into any of the aforementioned devices for use with the envisioned method.

Figure 1:
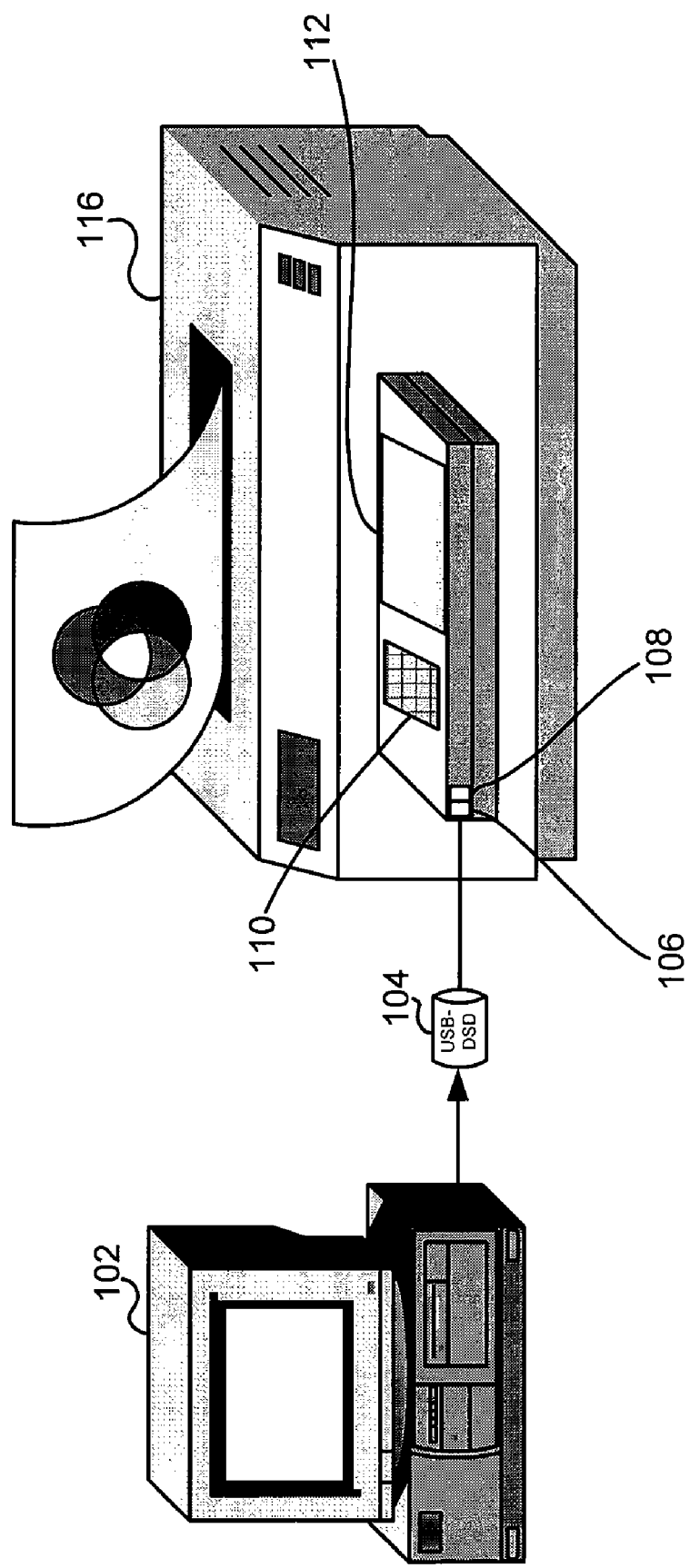
FIG. 1 is a block diagram of a system contemplated by the present invention.

Turning to FIG. 1, there is shown an exemplative system showing a personal computer 102, a Universal Serial Bus, or USB, data storage device 104 and a multifunction peripheral device 116. A suitable client machine is any suitable networked computer or data terminal as will be appreciated by one of ordinary skill in the art. While referenced as a networked computer, it will be appreciated that the use of the envisioned method and system does not require the computer be networked. The multifunction peripheral device 116 may be operating independent of a computer network, or the client machine 102 may be operating independent of any computer network. The client machine 102 is configured with at least one USB port (not shown), suitably adapted to receive any USB enabled device. It will be appreciated by one skilled in the art that the incorporation of USB ports is well-known and computers typically include two or more USB ports. It will be understood by those skilled in the art that the operation of a USB port is platform independent and therefore the operating system of the client machine 102 will not affect the insertion or removal of the USB-data storage device 104.

The USB-data storage device 104 may be any USB storage drive known in the art. Typically the size of an AA battery, USB storage drives are flash memory-based removable storage devices that are instantly recognized when plugged in to the USB port of a desktop or notebook PC. The USB-storage drive is composed primarily of NAND-flash memory, which is non-volatile and capable of retaining memory following removal of a power supply. The USB-data storage device 104 is suitably adapted to hold any number of files of varying formats. Present storage capacity is available in the 32 MB, 64 MB, 128 MB, 256 MB, 512 MB and 1 GB range, however continual advancements and improvements are likely to result in ever larger capacities. Those skilled in the art will appreciate that the present invention need not be constrained to NAND-flash memory, but rather is applicable to any mass storage device, irrespective of memory composition, capable of interfacing directly with a USB port. It will further be acknowledged by those skilled in the art that the USB ports described herein are typically USB 2.0 ports, however USB 1.1 ports or future configurations of the universal serial bus ports should not be excluded.

The multifunction peripheral device 116 may be any suitable printer/fax/copier/scanner office machine or the like, configured with a liquid crystal display 112 for a user interface. It will be understood by those skilled in the art that the liquid crystal display may include touch-sensitive screens. While the preferred embodiment discussed herein utilizes a separate keypad 110 for user input, alternate embodiments of the present invention use the responsive touch-screens receiving and displaying user input. Also included on the multifunction peripheral device 116 are USB ports 106 and 108, enabling the placement of more than one USB-data storage devices. While the present invention is described herein as having a single USB-data storage device, it will be understood that the method and system described herein are readily adapted to multiple storage devices. Having thus presented an exemplary description of the present invention, attention is now directed to the method used by the preferred embodiment.

Figure 2:
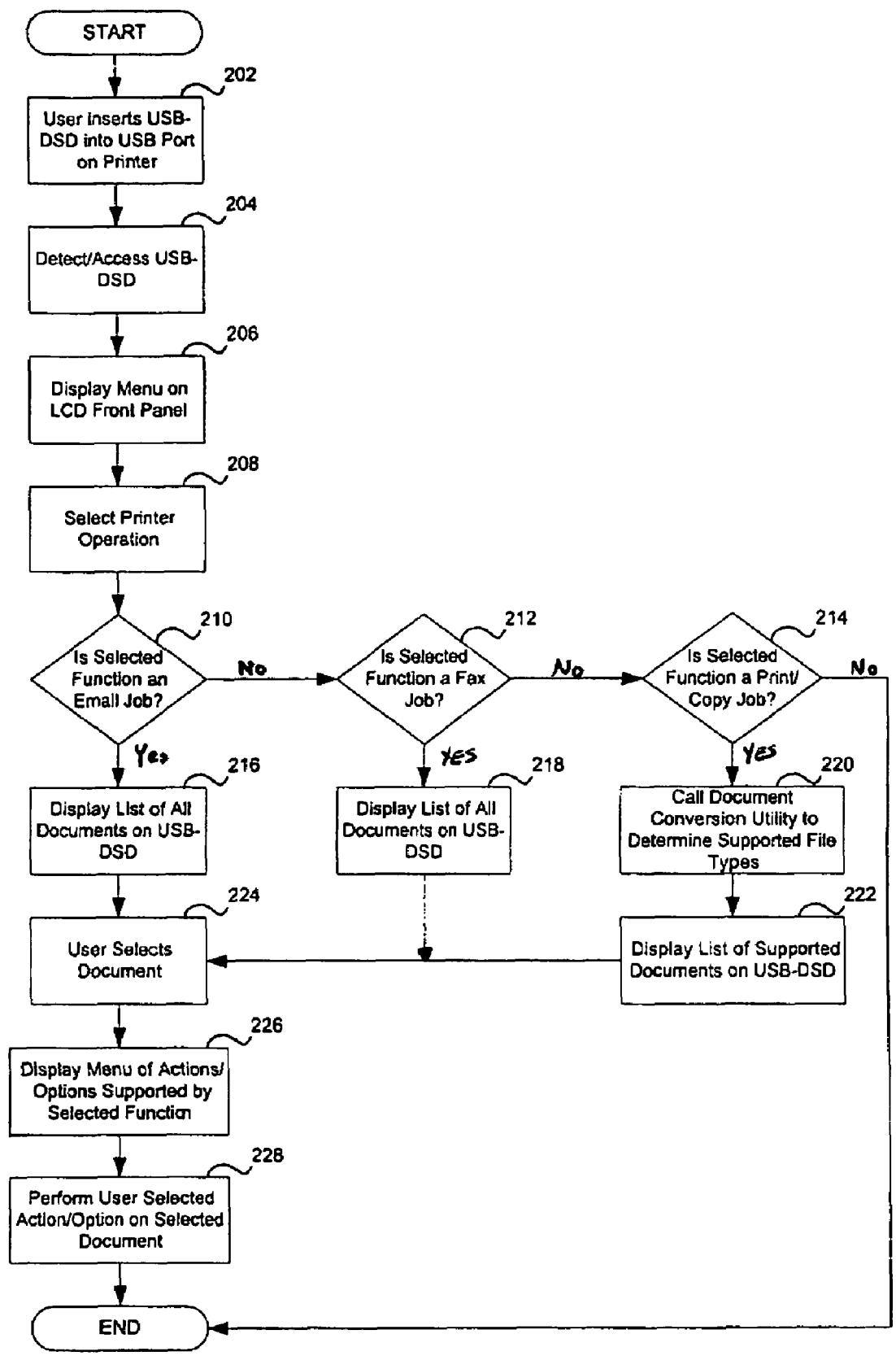
FIG. 2 is a flow chart diagram of the operation envisioned by the present invention.

Turning to FIG. 2, there is shown a method wherein an administratively controlled service operating on the multifunction peripheral device 116. The following description denotes the operation of a service running on a printer controller. The service is controllable by an administrator having the ability to enable or disable the service for some users, all users, or the like. As used herein, the controller represents a component of the multifunction peripheral device 116 that controls the operations of the multifunction peripheral device 116, including scanning, copying, faxing, emailing, printing and the like. It will be understood by those skilled in the art that the present use of a controller need not limit the present invention solely to those multifunction peripheral devices having controllers, but rather may be incorporated into other control methods or components, residing on other types of multifunction peripheral devices. As the method is described hereunder, the components previously described in FIG. 1 will be used to explain, rather than limit, the application of the envisioned method.

Figure 3:
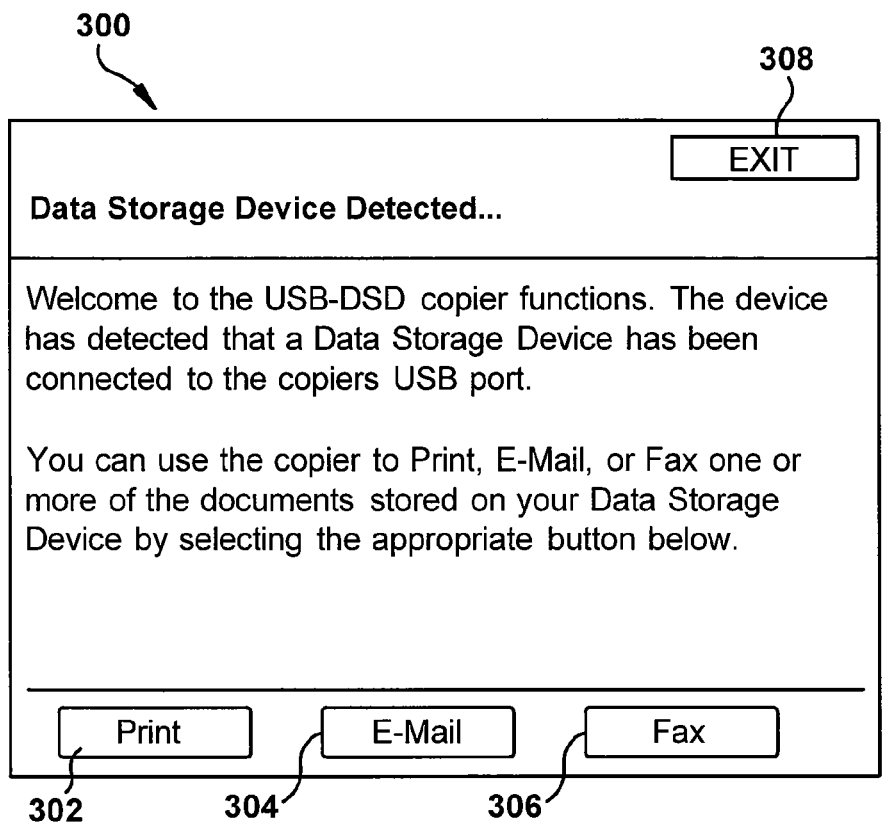
FIG. 3 is a representative depiction of a display screen upon detection of a Universal Serial Bus data storage device.

The method begins at 202 with the insertion of a USB-data storage device 104 into a USB port 106 on the multifunction peripheral device 116. In accordance with the drivers inherent in the controller, the USB-data storage device 104 is detected and subsequently accessed by the controller at 204. The USB-data storage device 104 will preferably draw its power from the USB port 106, however one skilled in the art may recognize that an external source of power, as may be known in the art, may be required for accessing the USB-data storage device 104. Having accessed the USB-data storage device 104, the controller presents, on the LCD display 112, a menu listing the functions capable of being performed by the multifunction peripheral device 116 at step 206. An example of the menu displayed by the controller may be seen at FIG. 3. The menu 300 is shown on the LCD display 112 of the multifunction peripheral device 116. Using the user interface 110, or alternatively a touch-screen enabled display, a user selects one of four choices. The user may depress the icon designated, "Print" 302, "E-Mail" 304, "Fax" 306 or "Exit" 308. The method waits for a user to select one of the four choices at step 208. In the event that the user decides not to perform any of the functions displayed on the LCD display 112, the user selects the "Exit" 308 icon and the controller enables the prompt and safe removal of the USB-data storage device 104 from the USB port 106, thereby allowing another use access to the multifunction peripheral device 116.

The remaining three icons, "Print" 302, "E-Mail" 304, and "Fax" 306 each represent a different set of functions capable of performance by the multifunction peripheral device 116. The "Print" 302 icon denotes the printing of a document retrieved from the USB-data storage device 104. The "E-Mail" 304 icon denotes the forwarding as either an email or an attachment of a document retrieved from the USB-data storage device 104. Further, the "Fax" 306 icon denotes the transmission to a recipient facsimile machine of a document retrieved from the USB-data storage device. Returning now to FIG. 2, a user selects the desired function to be performed at step 208. At step 210, the service running on the controller determines whether the selected function is to be an email request. A positive determination at step 210 progresses the service to display a listing of all documents and files stored on the USB-data storage device 104 at step 216. As email can handle multiple formats, no need to limit the type of files returned by the service is required, thus the user has access to send any or all of the files stored on the USB-data storage device directly from the LCD display 112 of the multifunction peripheral device 116.

After displaying the files that are capable of being emailed, the service waits for the use to select, at step 224, a document or documents, figures, pictures and the like for transmission. It will be appreciated that the file to be sent via email need not be a word processor file, it may be any one of a group of file types, images and the like, that are sent to a third party from the USB-data storage device 104 via the multifunction peripheral device 116. Once the user has selected the particular file at step 224, the service then displays on the LCD display 112 at step 226 a second menu composed of actions or options corresponding to the function selected at step 208. For the Email option of the present example, the actions include, but are not limited to attaching a file, selecting an addressee, selecting a subject line, composing a brief message, encryption, decryption and the like. Upon a user confirmation of the selected options/actions corresponding to the selected function, the service instructs and/or controls at step 228, the multifunction peripheral device 116 in the performance of the selected option or action on the chosen documents.

Returning to step 210, a determination that the selected function is not an email job results in the service determining the user selected function is facsimile creation and transmittal at step 212. The service then displays a list of the files residing on the USB-data storage device at step 218. A user is then prompted to select one of the files shown on the list at step 224. Subsequently, a menu of actions and/or options corresponding to the selected function of faxing are displayed at step 226 on the LCD display 112 of the multifunction peripheral device 116. The user is asked to choose those options or actions to undertake with respect to the selected file. For the Fax option of the present example, the actions include, but are not limited to selecting an addressee, selecting a greeting, salutation or the like, selecting a subject, checking for errors, selecting a corresponding telephone number, and the like. The user is subsequently prompted for confirmation of the choices and actions to be performed. Following the user's confirmation of the selected services and or functions, the service performs the action/option selected at step 228.

Returning to step 212, a determination that the selected function is not a fax job results in progression of the service to step 214. At step 214, the service must ascertain that the user selected function is a print/copy job. In the event that the determination at step 214 proves to be negative, the service proceeds to terminate the operation, renders the USB-data storage device safe and prompts the user for removal of the USB-data storage device from the USB port 106 on the multifunction peripheral device 116. When a user has selected a print/copy function of the multifunction peripheral device 116 at 208, the service calls a document conversion utility to determine the file types supported by the controller and available on the USB-data storage device 104 at step 220. The document conversion utility is capable of converting a number of supported documents such as Word, Excel, PDF, PowerPoint, AutoCAD and the like, into a postscript that is understood by the printer. It will be appreciated by those skilled in the art that the conversion of a document into a printer job language or a page description language may be accomplished by the document conversion utility. The use of postscript herein is for exemplification purposes only and should not be construed to limit the present invention in any manner.

Figure 4:
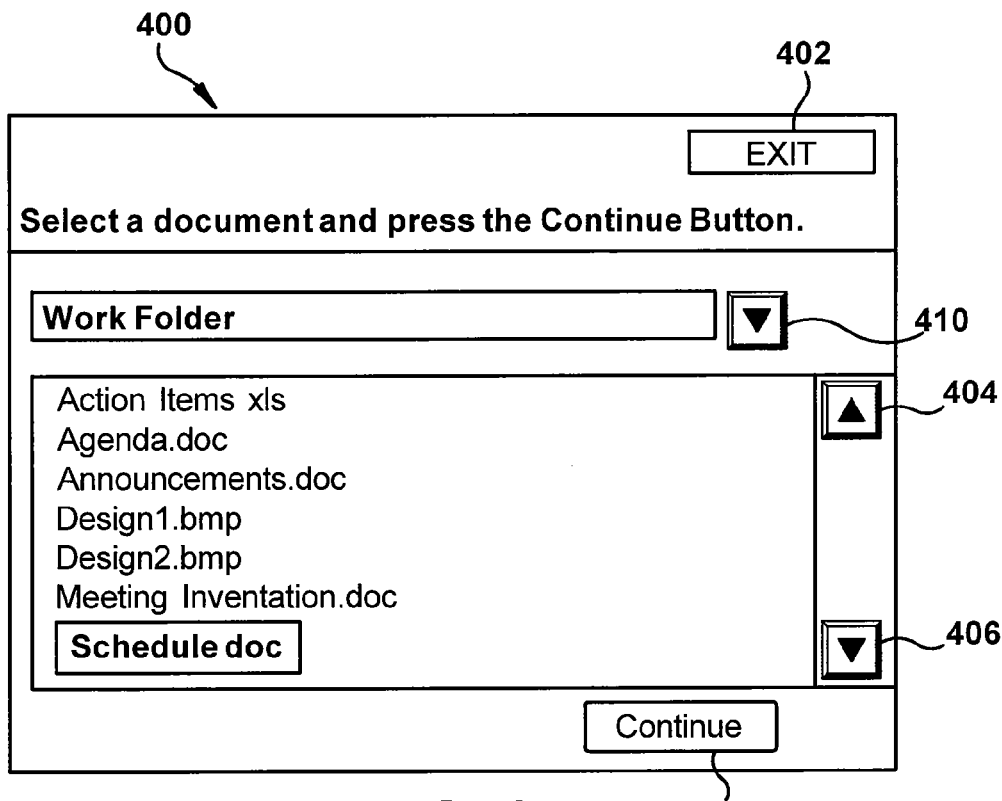
FIG. 4 is a representative depiction of a display screen showing a list of files contained on a Universal Serial Bus data storage device.

After invoking the document conversion utility at 220, the service allows the utility to scan the USB-data storage device 104 and generate a list of files residing on the storage device 104 that are supported by the multifunction peripheral device 116. This list is returned at step 222 to the LCD display 112 for subsequent selection by a user. A representative screenshot of the present embodiment is shown at FIG. 4. As demonstrated in FIG. 4, the display screen 400 depicts the LCD image typically associated with the listing of files stored on the USB-data storage device 104. A user, in the event of a miss-entry or error, may exit this screen utilizing the exit icon 402. As shown in the display screen 400, there is a list of supported file types, further organized under the term "work folder". Different folders of the USB-data storage device 104 are accessible in this screen via the pull-down menu 410. Below the pull-down menu, there is shown a listing in alphabetical order of all the documents available for printing/copying on the USB-data storage device. Scroll arrows 404 and 406 allow for the display of additional files retrieved by the service from the USB-data storage device 104.

Figure 5:
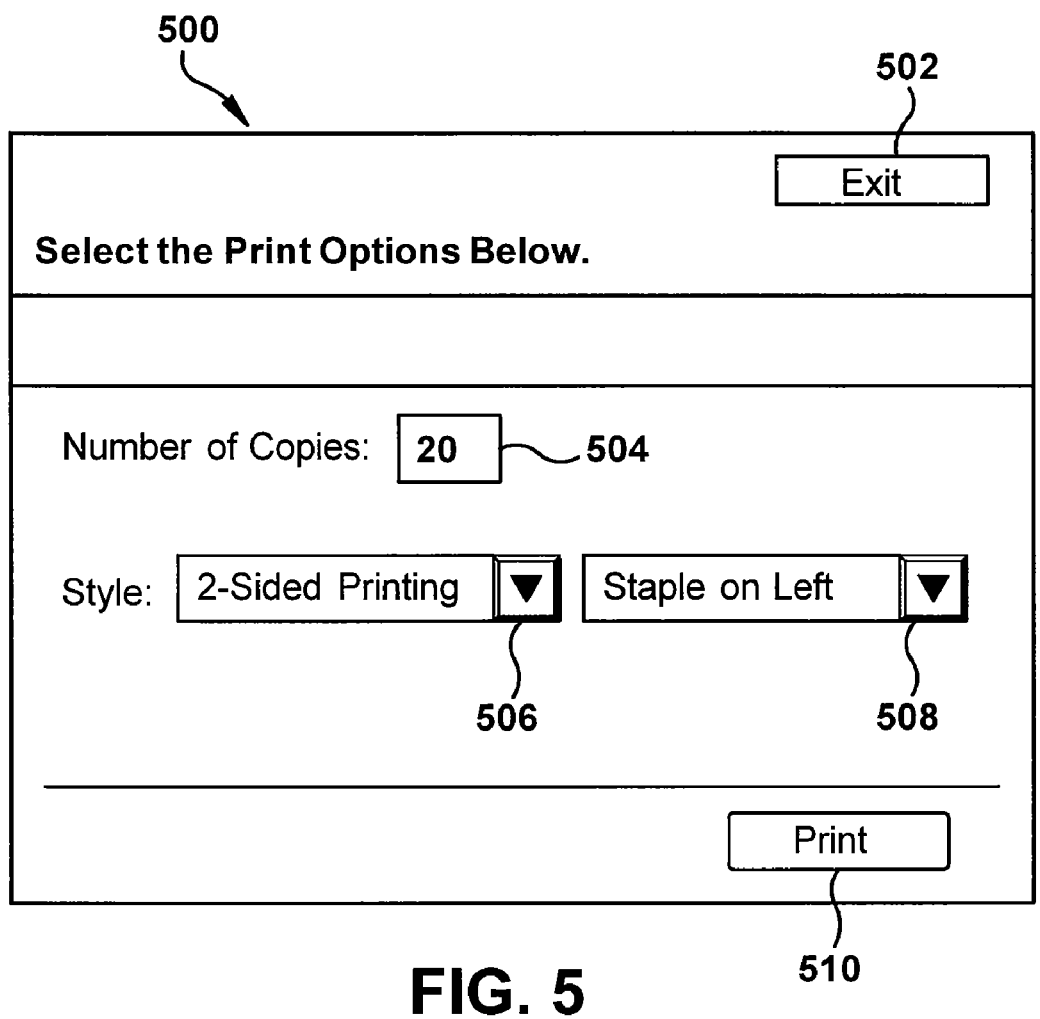
FIG. 5 is a representative depiction of a display screen showing the options available for a selected document.

Upon the selection of the chosen document at step 224, the user will depress the icon "continue" 408 to move to the next step in the process. Returning to FIG. 2, at step 224 a user inputs the chosen file to be printed/copied from the USB-data storage device 104. As shown in FIG. 4, the user has selected the file "Schedule.doc" for printing or copying. The service now provides the user with a listing of possible actions or options that may be performed in addition to the selected function, occurring at step 226. Further exemplification may be viewed by turning to FIG. 5. As depicted in FIG. 5, there is shown a screenshot 500 of an options page corresponding to the print function. In the event that the user has mistakenly selected the print function, or has chosen the wrong file, the user may return to the previous screen by pressing the "Exit" icon 502. Shown on the print options screenshot 500, there are the number of copies 504, the style 506 and the finishing options 508.

After selection of the appropriate options/actions, the user merely selects the "Print"icon 510 and the document, incorporating the selected options and actions is printed directly from the USB-data storage device.

It will be appreciated that the number of copies 504 is indicative of a user selected parameter and not limiting to the present invention. The style 506 incorporates a pull-down menu listing multiple style changes possible, duplex, portrait/landscape, multi-page, number of prints, as well as formats, for the data files stored on the USB-data storage device. The finishing options 508 includes such common options as stapling, hole-punching, binding and the like. Once the user has selected the desired options, the service proceeds to step 228, where the service directs the multifunction peripheral device to perform the user selected option or action on the selected document.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of the ordinary skilled in the art to utilize the invention in various embodiments and with various modifications as are suited to the particular use contemplated. All such modifications and variations are within the scope of the invention as determined by the appended claims when interpreted in accordance to the breadth to which they are fairly, legally and equitably entitled.

Having thus described the invention, it is now claimed:

1. A method for processing a document from an associated portable data storage device, comprising the steps of:

receiving the associated portable data storage device into a document rendering device, the portable data storage device inclusive of at least one electronic document stored in a native application format from which it was generated;

receiving administrative data representative of document processing privilege;

selectively activating, in accordance with received administrative data, a document processing service associated with the document rendering device upon insertion of the portable data storage device;

testing the native application format of the at least one electronic document relative to capabilities of the associated document rendering device;

generating a display corresponding to a plurality of available document processing operations available on the at least one electronic document in accordance with an output of the step of testing;

receiving selection data from an associated user corresponding to at least one document processing operation selected from the plurality thereof reflected on the generated display to be performed on the at least one electronic document; and commencing operation of the associated document rendering device in accordance with received user input and available document processing operations.

2. The method of claim 1, wherein the document processing options are displayed on a menu on a display console located on the document rendering device.

3. The method of claim 1, wherein the portable data storage device is a universal serial bus data storage device.

4. The method of claim 1, wherein the document processing option is an electronic mail request, further comprising the steps of:

displaying a menu of at least one action corresponding to the document processing option;

selecting one of the at least one action displayed; and performing the document processing option in accordance with the selected at least one action.

5. The method of claim 1, wherein the document processing option is a facsimile request, further comprising the steps of:

displaying a menu of at least one action corresponding to the document processing option;

selecting one of the at least one action displayed; and performing the document processing option in accordance with the at least one selected action.

6. The method of claim 1, wherein the document processing option is a print request, further comprising the steps of:

displaying a menu of at least one action corresponding to the document processing option;

selecting one of the at least one action displayed; and performing the document processing option in accordance with the at least one selected action.

7. The method of claim 1, further comprising the step of selecting processing parameters associative of the document processing options.

8. The method of claim 7, wherein the processing parameters are image medium parameters.

9. The method of claim 7, wherein the processing parameters are image transmission parameters.

10. The method of claim 7, wherein the processing parameters are image output location parameters.

11. A system for processing a document from a portable data storage device, comprising:

means for receiving an associated portable data storage device into a document rendering device, the portable data storage device inclusive of at least one electronic document stored in a native application format from which it was generated;

means for receiving administrative data representative of document processing privilege;

means for selectively activating, in accordance with received administrative data, a document processing service associated with the document rendering device upon insertion of the portable data storage device;

means for testing the native application format of the at least one electronic document relative to capabilities of the associated document rendering device;

means for generating a display corresponding to a plurality of available document processing operations available on the at least one electronic document in accordance with an output of the step of testing;

means for receiving selection data from an associated user corresponding to at least one document processing operation selected from the plurality thereof reflected on the generated display; and means for commencing operation of the associated document rendering device in accordance with received user input and available document processing operations.

12. The system of claim 11, wherein the document processing options are displayed on a menu on a display console located on the document rendering device.

13. The system of claim 11, wherein the portable data storage device is a universal serial bus data storage device.

14. The system of claim 11, wherein the document processing option is an electronic mail request, further comprising:

means for displaying a menu of at least one action corresponding to the document processing option;

means for selecting one of the at least one action displayed; and means for performing the document processing option in accordance with the selected at least one action.

15. The system of claim 11, wherein the document processing option is a facsimile request, further comprising:

means for displaying a menu of at least one action corresponding to the document processing option;

means for selecting one of the at least one action displayed; and means for performing the document processing option in accordance with the at least one selected action.

16. The system of claim 11, wherein the document processing option is a print request, further comprising:

means for displaying a menu of at least one action corresponding to the document processing option;

means for selecting one of the at least one action displayed; and means for performing the document processing option in accordance with the at least one selected action.

17. The system of claim 11, further comprising means for selecting processing parameters associative of the document processing options.

18. The system of claim 17, wherein the processing parameters are image medium parameters.

19. The system of claim 17, wherein the processing parameters are image transmission parameters.

20. The system of claim 17, wherein the processing parametersare image output location parameters.

* * * * *